United States Patent [19]
Hoff

[11] Patent Number: 5,363,977
[45] Date of Patent: Nov. 15, 1994

[54] PORTABLE BARBECUE AND COOLER CARRYING APPARATUS

[76] Inventor: Murray Hoff, 224 San Benancio Rd., Salinas, Calif. 93908

[21] Appl. No.: 145,027

[22] Filed: Oct. 28, 1993

Related U.S. Application Data

[63] Continuation-in-part of Ser. No. 850,907, Mar. 13, 1992, abandoned.

[51] Int. Cl.$^5$ ............................................. A47J 37/07
[52] U.S. Cl. .................................. 220/4.27; 220/4.04; 220/23.83; 62/457.1; 126/25 R
[58] Field of Search ............ 206/549, 542; 126/25 R, 126/9 R, 25 B; 220/4.04, 4.26, 4.27, 8, 23.83, 23.86, 212, 212.5, 770, 771, 908, 909, 911; 62/331, 371, 457.1, 457.2

[56] References Cited

U.S. PATENT DOCUMENTS

| | | | |
|---|---|---|---|
| 691,662 | 1/1902 | Quarelli | 220/8 |
| 985,106 | 2/1911 | Bradshaw | 220/8 |
| 2,575,299 | 11/1951 | Scheel | 220/4.27 |
| 2,673,454 | 3/1954 | Gallie et al. | 62/331 |
| 2,827,846 | 3/1958 | Karkling | 206/542 |
| 2,852,016 | 9/1958 | Weatherwax | 220/23.83 |
| 2,915,001 | 12/1959 | Montgomery | 220/4.27 |
| 3,338,388 | 8/1967 | Igoe et al. | 220/8 |
| 3,684,087 | 8/1972 | Anderson | 206/542 |
| 3,811,559 | 5/1974 | Carter | 220/4.27 |
| 4,094,295 | 6/1978 | Boswell et al. | 126/9 R |
| 4,108,142 | 8/1978 | Barson et al. | 126/25 R |
| 4,554,864 | 11/1985 | Smith et al. | 126/25 R |
| 4,706,817 | 11/1987 | Greathouse | 206/549 |
| 4,866,572 | 9/1989 | Blodgett | 62/331 |
| 4,977,824 | 12/1990 | Shinler | 126/25 R |
| 5,036,832 | 8/1991 | Schlosser et al. | 126/25 R |
| 5,056,424 | 10/1991 | Lai | 206/549 |
| 5,154,158 | 10/1992 | Lindsey | 126/25 R |
| 5,174,272 | 12/1992 | Clark | 126/25 R |

FOREIGN PATENT DOCUMENTS 0005882 4/1916 United Kingdom ............... 220/4.26

Primary Examiner—S. Castellano
Attorney, Agent, or Firm—Jeffrey A. Hall

[57] ABSTRACT

A portable barbecue and cooler carrying apparatus includes a base element, an essentially tubular central housing member removably secured to the base element, and a cover element removably connected to the base element. The central housing member includes fastening apparatus for supporting a standard barbecue kettle, and the housing bottom is closed to receive and retain ashes or coal. A cooler may be removably attached to the base element, and the cover element surrounds the tubular central housing and tile base element and holds the elements in their assembled position.

4 Claims, 3 Drawing Sheets

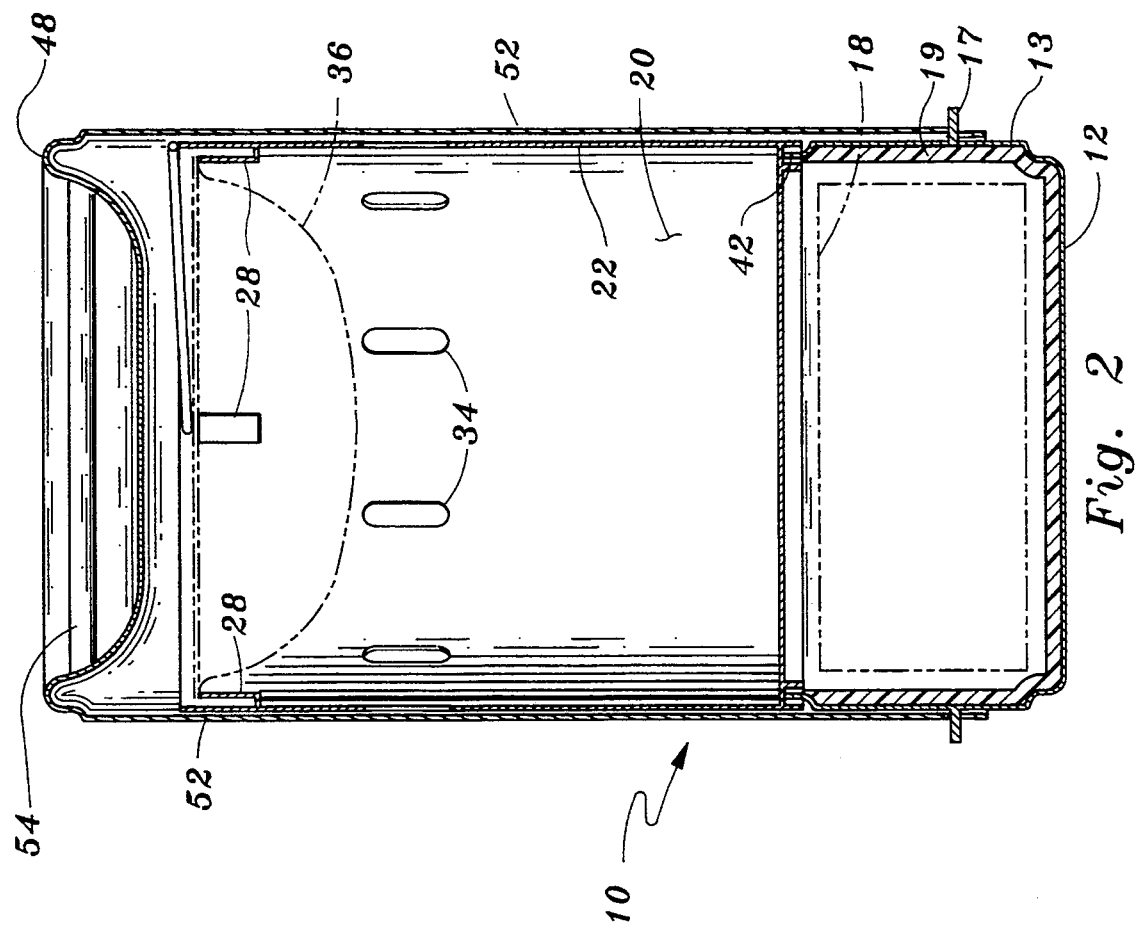
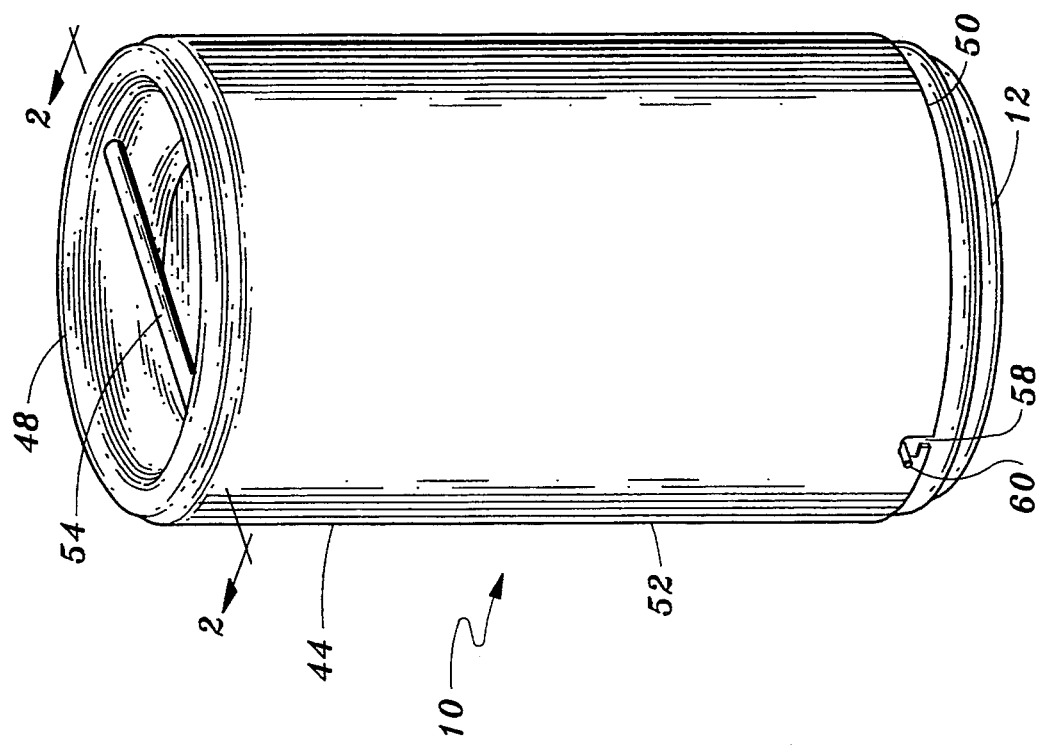

PORTABLE BARBECUE AND COOLER CARRYING APPARATUS

RELATED APPLICATIONS

This is a continuation-in-part of Ser. No. 07/850,907 filed Mar. 13, 1992 now abandoned.

BACKGROUND OF THE INVENTION

1. Field of Invention

This invention relates to barbecue and cooler carrying devices, and more particularly to barbecue and cooler carrying devices which are portable and allow for barbecues with minimum environmental impact.

2. Description of the Related Art

Numerous barbecues and coolers have been proposed and implemented for picnics, barbecues, parties, and other outdoor events. Various structures have been proposed and utilized for such purposes.

In general, both barbecues and coolers provide for easy and convenient cooking and cooling of food and drinks in an outdoor environment. However, there are significant problems with conventional barbecue and coolers, and particularly with barbecues, when transporting them to the beach, to a boat, to a camp site, or other locations. In particular, barbecue supplies must be carrier to the site and ashes, hot coals, and other litter create a significant environmental problem. For example, hot coals left at a barbecue site are not only unsightly, they also create a very real threat of environmental damage by fire. Accordingly, it is the primary object of this invention to provide an improved portable carrying apparatus for barbecues and coolers which may be easily and conveniently used to carrying a barbecue kettle, charcoal, cooler, food, and other supplies to a barbecue or picnic site, and allows for the convenient removal of ashes, coals, trash, and other debris from the site.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a combined barbecue and cooler carrying apparatus allowing for safe, clean, and minimal environmental impact barbecues and picnics, comprising: a hollow base element including cooler means removably connected therein; an essentially tubular central housing member removably secured to said hollow base element and including means for removably supporting a barbecue kettle within said tubular central housing member; and a cover element removably connected to said hollow base element including means for transporting said combined barbecue and cooler carrying apparatus.

The cooler means preferably includes means for holding, storing, and transporting, ice, food, drinks, and other foodstuffs, and may be insulated or insulating material may be incorporated on the inner walls of the base element. Means for removably supporting a barbecue kettle within the tubular central housing member are preferably mechanical fastening means, but may be otherwise. In accordance with the present invention there also is provided a portable housing for a barbecue and a cooler, comprising: a base element with a wall defining a hollow portion, said wall having a top edge and a bottom edge and fastening means thereon; a central member having a housing defining a hollow inner portion, said housing having an inner wall and an outer wall; said inner wall including a plurality of hooks mounted thereon for supporting a barbecue kettle within said central member; the central member being removably connected to said base element; and a jacket element removably connected to said base element with a wall defining a cavity of sufficient dimensions to encompass said base element and said central member therein.

The central member is preferably open at the top but closed at the bottom and includes apertures allowing draft in its side walls below the supported kettle. There is sufficient space in the housing to also accommodate charcoal, food, paper, and other barbecue supplies. The cooler may be supplied as a separate unit or as part of the housing. In one embodiment a cup-shaped cooler is removably secured to the bottom of the base element. A handle at the top of the jacket element enables the entire assembled unit to be carried to and from the barbecue site, with the central member carrying any ashes, coal, trash, etc. for disposal at an appropriate site.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principals of the invention.

FIG. 1B is a perspective view of a portable housing and carrier apparatus for a barbecue and a cooler incorporating the teaching of the present invention.

FIG. 2 is a side sectional view through 2—2, showing an assembled portable housing and carrying apparatus for a barbecue and cooler, according to the invention.

DESCRIPTION OF THE PREFERRED EMBODIMENTS

Reference will now be made in detail to the present preferred embodiments of the invention as illustrated in the accompanying drawings.

In accordance with tile purpose of the present invention, there is provided a combined barbecue and cooler carrying apparatus allowing for safe, clean, and minimal environmental impact barbecues and picnics, comprising: a hollow base element including cooler means removably connected thereto; an essentially tubular central housing member removably secured to said hollow base element and including means for removably supporting a barbecue kettle within said tubular central housing member; and a cover element removably connected to said hollow base element including handle means for transporting said combined barbecue and cooler carrying apparatus.

There is also provided, in accordance with the present invention a portable housing for a barbecue and a cooler, comprising: a base element with a wall defining a hollow portion, said wall having a top edge and a bottom edge and fastening means thereon; a central member having a housing defining a hollow inner portion, said housing having a wall including a plurality of hooks mounted thereon for supporting a barbecue kettle within said central member; the central member being removably connected to said base element; and a jacket element removably connected to said base element with a wall defining a cavity of sufficient dimensions to encompass said base element and said central member therein.

Figure 1A:
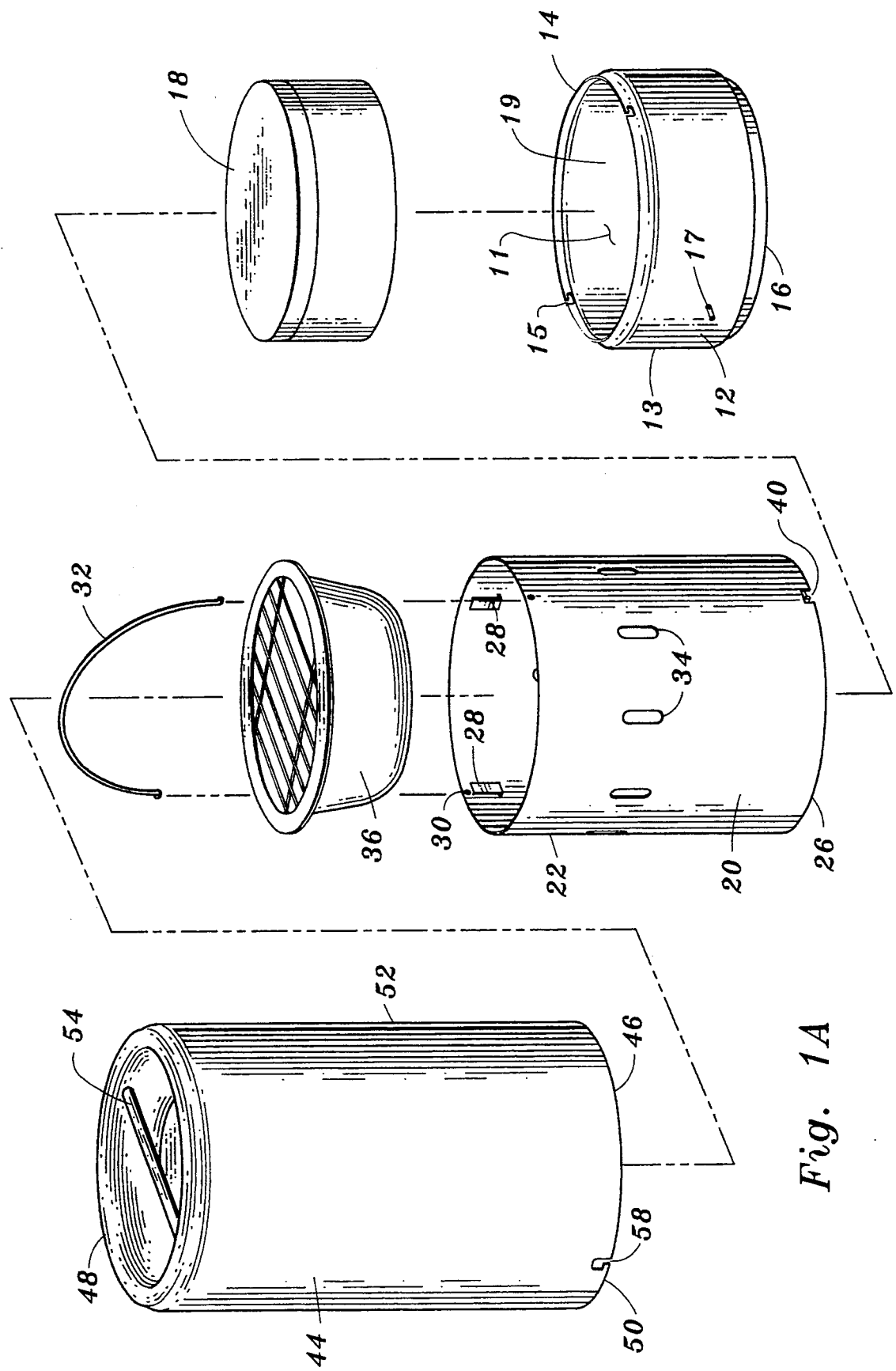
FIG. 1A is an exploded view of a portable housing and carrier apparatus for a barbecue and cooler incorporating the teaching of the present invention.
Figure 5:
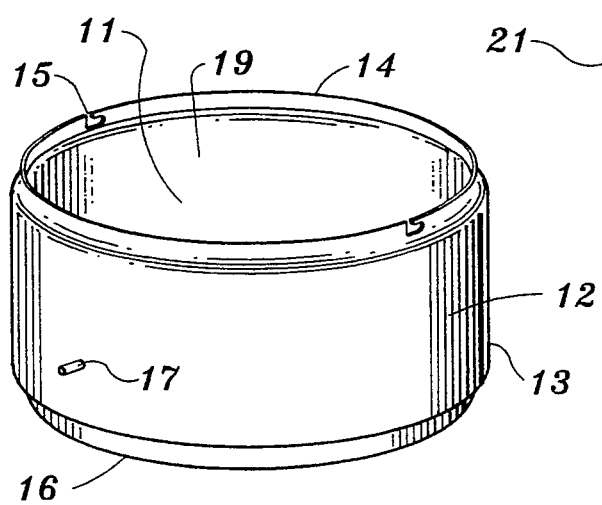
FIG. 5 is a perspective view of a base element for such housing and carrying apparatus, according to the invention.

In FIG. 1A, 1B, and 5, the portable barbecue and cooler carrying apparatus 10 is shown having a base element 12 with a wall 13 defining a hollow portion 11 therein. Wall 13 has a top edge 14 and a bottom edge 16, and preferably includes fastening means thereon, which can be studs 17 and notches 15, however, other fastening means may also be provided such as hooks, grooves, clamps, and the like. Base element 12 is preferably of a cylindrical configuration and composed of a durable, resilient material such as metal, combination of metals, composite, thermoplastic, or the like. A cooler 18 may be placed and carried in hollow portion 11, or alternatively, wall 13 may be provided with an insulating material 19, such as foam, plastic, polymers, or the like. Cooler 18 is preferably cup-shaped, but may be otherwise, such as rectangular, elliptical, or round.

Figure 3:
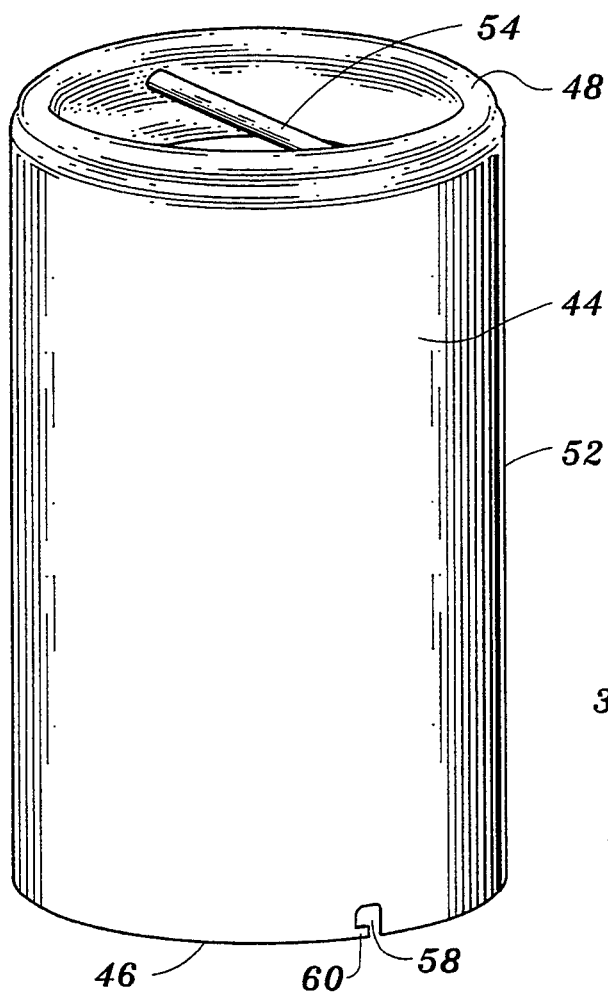
FIG. 3 is a perspective view of a cover element for such housing and carrying apparatus, according to the invention.
Figure 4:
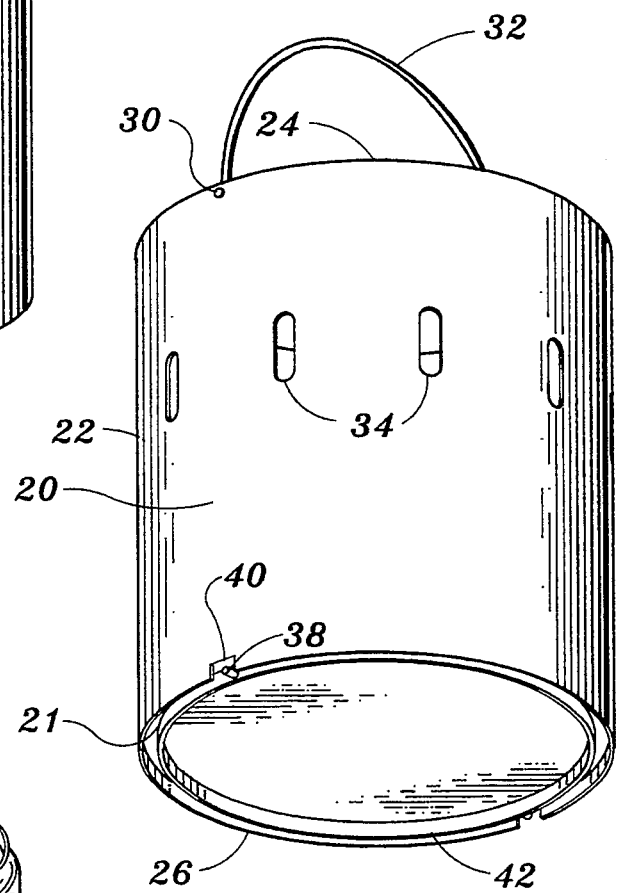
FIG. 4 is a perspective view of a central housing member for such housing and carrying apparatus, according to the invention.

As shown in FIGS. 1A, 1B, 2, and 4, a central member 20 includes a wall 22 defining a hollow inner portion 21. Wall 22 of housing 20 includes means for removably supporting a barbecue kettle 36 which, in the preferred embodiment are hooks 28, however, other fastening means such as clamps, ridges in wall 22, rings, and the like may also be used. Central member 20 is shown with top edge 24, bottom edge 26, and apertures 30 in wall 22 for securing and holding a detachable handle 32. Handle 32 is used to carry central member 20 as a separate unit from portable housing 10 which is very useful for placement and positioning of central member 20. However, when the assembled housing is to be carried, transported, or stored, handle 32 is removed and can be stored in the hollow inner portion 21. Barbecue 36 is shown as a standard barbecue which may be set within central member 20 for transport, cooking, storage or the like. Central member 20 is preferably of a cylindrical shape and is adapted to be removably connected to base element 12. Studs 38 are secured into notches 15, which are preferably fashioned in a substantially L-shaped configuration, but may be otherwise. To further secure central member 20 to base element 12 an inset or inner ring 42 is provided into which top edge 14 of base element 12 is secured. Ring 42 carries oppositely and outwardly directed studs 38 which can enter the L-shaped notches 38 in the sides of base element 12. A plurality of draft ventilation slits or apertures 34 are spaced on wall 22 allowing for draft from central member 20 and barbecue 36. A metal strip may be hingedly mounted on wall 22 allowing for selected closure of draft aperture 34 by selected closure with the strip of metal. Central member 20 is preferably composed of a metal, but may be any durable, heat resilient material, such as a composite or thermoplastic. Referring now to FIGS. 1A and 3, a cover or jacket element 44 is shown removably connected to base 12 and having a wall 52 defining a cavity 46 of sufficient dimensions to encompass base element 12 and central member 20. Cover 44 is preferably cylindrical in shape but may be otherwise, and includes a wall 52 defining a cavity 46 into which base element 12 and central member 20 may be removably secured. Cover element 44 includes a top edge 48 and a bottom edge 50. A handle 54 is provided on cover 44 to facilitate transport of portable housing 10. Notches 58 in wall 52 are configured, preferably in a substantially L-shape, to receive and secure studs 17 of base 12. Alternatively, base 12 may be provided with notches to receive studs 60 on 44, or other mechanical fastening means may be utilized such as, rings, clamps, bolts, and the like.

In an alternative embodiment, a combined barbecue and cooler carrying apparatus 10 allowing for safe, clean, and minimal environmental impact barbecues and picnics is provided by an apparatus having a hollow base element 12 including cooler means removably connected thereto. Cooler means may be a separate, removable cooler unit 18, or provided by insulation 19 in base element 12. An essentially tubular central housing member 20 is removably secured to hollow base 12 and include means for removably supporting a barbecue kettle 36 with tubular central housing member 20. A cover element 44 is removably connected to hollow base element 12 by studs 17 in base 12 latching within notches 58 in wall 52 of cover 44. Cover 44 preferably is provided with handle 54 mounted on cover 44 to aid in the transport and positioning apparatus 10. Means for supporting barbecue kettle 36 in central housing member 20 preferably comprises a plurality of hangers 28, but may be otherwise, such as hooks, clamps, rings, and the like. A plurality of spaced apertures 34 allowing for ventilation of smoke, air, and other gasses are spaced around wall 22. As in the first embodiment described, cover 44 is preferably removably connected to base 12 by mechanical fastening means such as studs 17 on base 12 latching within notches 58 of cover 44, However, other fastening means well known in the art may be utilized. A pair of apertures may also be included in wall 22 of central housing 20 allowing for attachment of handle 32.

In operation and use, the portable barbecue and cooler carrying apparatus 10 is easy to assemble, transport, use, and manufacture. Carrying apparatus 10 provides a very convenient and environmentally sound means for a having a barbecue and/or picnic. For example, there are many areas in which having a barbecue or picnic will cause environmental damage, such as at an ocean beach, a river beach, parks, forests, etc., in fact anywhere that fire-pits or barbecues are not provided. Carrying apparatus 10 allows for the transport of necessary supplies into such areas, and having a barbecue at such sites without causing any environmental damage because barbecue 36 can be supported off the ground in central housing member 20. Furthermore, when leaving a site, trash, ashes, and all debris can be easily removed by placing them in apparatus 10 and then carrying them away. For example, the user may carry apparatus 10 into a chosen site with barbecue 36, charcoal, paper, and other supplies in housing 20. Cooler 18 is secured within base element 12 and may accommodate ice and standard beverage cans as well as food. Cover 44 encloses both housing 20 and base 12 and allows for easy and convenient transport.

Once at a chosen site, cover 44 is removed from base 12 and central housing 20, cooler 18 removed, and a barbecue may be started in barbecue kettle 36. When finished the user simply connects housing 20 to base 12 and cover 44 over housing 20 and base 12. Trash, ashes, and other debris may be packed into apparatus 10 and removed from the site. No coals, ashes, or damage from coals or ashes remain and therefore there is no environmental impact from the barbecue.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the applicant's general inventive concept.

It is claimed:

1. A combined barbecue and cooler carrying apparatus allowing for safe, clean, and minimal environmental impact barbecues and picnics, comprising:

a hollow base element including a cup-shaped cooler removably connected thereto;

an essentially tubular central housing member removably secured to said hollow base element and including means for removably supporting a barbecue kettle within said tubular central housing member; and a cover element removably connected to said hollow base element including handle means secured to said cover element for transporting said combined barbecue and cooler carrying apparatus; said cover element includes a plurality of notches in a wall thereof to receive and secure a plurality of studs on the base element.

2. The combined barbecue and cooler carrying apparatus of claim 1, wherein said means for supporting said barbecue kettle comprises a plurality of hangers within said central housing member whereby the barbecue kettle can be supported on said plurality of hangers within the central housing member.

3. The combined barbecue and cooler carrying apparatus of claim 1, wherein said central housing member further includes a plurality of spaced apertures in its sides.

4. The combined barbecue and cooler carrying apparatus of claim 1, wherein said central housing member further includes a pair of spaced apertures allowing for attachment of a carrying handle therein.

* * * * *